United States Patent
Lee

(10) Patent No.: US 11,865,972 B2
(45) Date of Patent: Jan. 9, 2024

(54) PORTABLE EMERGENCY SITUATION DISPLAY DEVICE FOR VEHICLE

(71) Applicant: Ki Sup Lee, Gwangju-si (KR)

(72) Inventor: Ki Sup Lee, Gwangju-si (KR)

( * ) Notice: Subject to any disclaimer, the term of this patent is extended or adjusted under 35 U.S.C. 154(b) by 201 days.

(21) Appl. No.: 17/620,051

(22) PCT Filed: Sep. 9, 2019

(86) PCT No.: PCT/KR2019/011598
§ 371 (c)(1),
(2) Date: Dec. 16, 2021

(87) PCT Pub. No.: WO2020/256216
PCT Pub. Date: Dec. 24, 2020

(65) Prior Publication Data
US 2022/0363191 A1    Nov. 17, 2022

(30) Foreign Application Priority Data

Jun. 17, 2019    (KR) .......................... 10-2019-0071283

(51) Int. Cl.
*B60Q 7/00*    (2006.01)
(52) U.S. Cl.
CPC ....................... *B60Q 7/00* (2013.01)
(58) Field of Classification Search
CPC .............. B60Q 7/00; B60Q 1/52; G09F 13/16
See application file for complete search history.

(56) References Cited

U.S. PATENT DOCUMENTS

| | | | | |
|---|---|---|---|---|
| 6,115,951 | A | * | 9/2000 | Jing .................. E01F 9/688 116/63 P |
| 2008/0224844 | A1 | * | 9/2008 | Hall .................. G09F 7/12 340/473 |
| 2020/0082680 | A1 | * | 3/2020 | Houle .................. G08B 5/006 |
| 2021/0197718 | A1 | * | 7/2021 | Lin .................. B60Q 7/005 |

FOREIGN PATENT DOCUMENTS

| | | | | |
|---|---|---|---|---|
| CN | 206914222 U | | 1/2018 | |
| KR | 1020050041574 A | | 6/2006 | |
| KR | 10-1136777 B1 | | 4/2012 | |
| KR | 101531285 B1 | * | 6/2015 | ............. G09F 13/16 |
| KR | 101667494 B1 | * | 10/2016 | ............. B60Q 7/00 |
| KR | 20160116404 A | * | 10/2016 | ............. B60Q 7/00 |
| KR | 1020170097502 A | | 6/2017 | |
| KR | 101778614 B1 | | 9/2017 | |
| KR | 101904673 B1 | | 9/2018 | |
| KR | 102041932 B1 | * | 11/2019 | ............. G06Q 40/04 |

* cited by examiner

*Primary Examiner* — Andrew W Bee
(74) *Attorney, Agent, or Firm* — Maschoff Brennan

(57) ABSTRACT

The present invention relates to an portable emergency situation display device for a vehicle, the device having a cover that closes the upper part of a case so that a warning display unit is not exposed to the outside when the warning display unit and a road safety image display unit are accommodated in the case, and thus damage to the warning display unit is prevented, wherein the warning display unit is fixed, at a certain angle, to an angle adjustment protrusion, formed on a support, while moving and rotating by means of spring elasticity, so as to maintain an accurate angle and prevent movement of the warning display unit, and a movement prevention unit is mounted at the lower part of the case so as to be exposed or retracted, thereby supporting the lower part of the case and minimizing shaking.

4 Claims, 9 Drawing Sheets

PORTABLE EMERGENCY SITUATION DISPLAY DEVICE FOR VEHICLE

TECHNICAL FIELD

The present invention relates to a portable emergency situation display device for a vehicle, and more particularly, to a portable emergency situation display device for a vehicle that has a cover that closes the upper part of a case so that a warning display unit is not exposed to the outside when the warning display unit and a road safety image display unit are accommodated in the case, and thus damage to the warning display unit is prevented, wherein the warning display unit is fixed, at a certain angle, to an angle adjustment protrusion, formed on a support, while moving and rotating by means of spring elasticity, so as to maintain an accurate angle and prevent movement of the warning display unit, and a movement prevention unit is mounted at the lower part of the case so as to be exposed or retracted, thereby supporting the lower part of the case and minimizing shaking.

BACKGROUND ART

In general, when a vehicle breaks down or has an accident while driving, the emergency situation display device kept in the vehicle is taken out and installed at the rear of the vehicle, so that the vehicle driving from the rear is informed that the vehicle is in a stationary state in front, thereby preventing a safety accident in advance.

Various methods and devices have been disclosed for the emergency display device described above, and the most common method is to install a reflective paper formed in a tripod shape to reflect light.

However, in such a tripod method, the tripod is installed not to be high from the ground, and the light reflectance of the reflective paper is low compared to the speed of a vehicle running from a distance, so that a driver in the vehicle running from the rear cannot easily identify the tripod.

In addition, there has been disclosed a movable speed bump in Korea Patent Registration No. 10-1136777, in which a speed bump is mounted on a road surface to prevent a vehicle from speeding.

However, such a speed bump is not easy to carry and install because its size is too large to be installed across a relatively large road width.

Recently, in order to solve such problems, there has been registered a portable road emergency display device as Korean Patent Registration No. 10-1904673.

In the registered patent, a display holder is formed on a mounting body in a foldable type, a folding warning display device including a plurality of bar display units is installed on one side of the foldable holder, and a speed bump display device is installed on an opposite side of the foldable warning display device.

However, in the above configuration, even when the foldable warning display device is folded into the mounting body, the bar display unit is exposed to an outside so that it is difficult to keep it, and the bar display unit is damaged by an external impact.

In addition, the deflection of the bar display unit that is spread at a certain angle occurs, so that the rear vehicle cannot accurately identify the emergency signal.

In addition, although the vibration of the mounting body is minimized by mounting an auxiliary fixing member on a lower portion of the mounting body, since the auxiliary fixing member is formed in a horizontal plate shape, the auxiliary fixing member is not properly adhered to and shakes when the ground is irregular.

DISCLOSURE

Technical Problem

Accordingly, the present invention has been made considering the various problems of the related art as described above, and an object of the present invention is to provide a portable emergency situation display device for a vehicle that protects a warning display unit from being exposed to the outside because a cover closes the upper portion of a case when the warning display unit and the road safety image display unit are kept in the case.

In addition, another object of the present invention is to provide a portable emergency situation display device for a vehicle in which a warning display unit is fixed at a certain angle to an angle adjusting protrusion formed on a support while being moved and rotated by the elasticity of a spring, so that it is possible to maintain the correct angle and prevent the movement of the warning display unit.

Still another object of the present invention is to provide a portable emergency situation display device for a vehicle in which a movement prevention unit is mounted on a lower portion of a case to be retractable so that it is possible to prevent the movement while stably supporting the lower portion of the case.

Technical Solution

According to an embodiment, there is provided a portable emergency situation display device for a vehicle, which includes a case provided therein with a receiving space to receive a road safety image display unit and a warning display unit and to supply power of a battery to the road safety image display unit and the warning display unit; the warning display unit mounted to be accommodated in the case and including a plurality of warning display panels controlled by a control unit and mounted in a foldable manner to display warning characters or warning signals; the road safety image display unit mounted on the warning display unit to visually display a road safety image on a road surface of a road by using an LED light source; a cover for closing an upper part of the case while preventing the warning display unit from being exposed to an outside when the warning display unit and the road safety image display unit are accommodated in the case; and a movement prevention unit retractably mounted on a lower part of the case to prevent the case from moving, wherein the movement prevention unit includes: a guide hole formed inside the case and having a plurality of adjustment grooves; a movement prevention member having a guide that is guided along the guide hole and an adjustment protrusion, in which movement prevention member protrudes outward of the case as the adjustment protrusion is latched to the adjustment groove; and an elastic member having opposite ends fixed to a fixing member and the adjustment protrusion formed in the case to give elasticity to the movement prevention member.

The warning display unit includes a support mounted on one side of the case and installed in multiple stages to enable height adjustment; a support body rotatably coupled to a head of the support to support the warning display panel; an operation button for controlling the warning display panel in front of the support body; a rotation control bolt coupled to the head of the support to control a rotation of the support body; and the warning display panels arranged in a row on the support body or spread out at a predetermined angle.

The warning display panel includes a main body rotatably mounted on the support body and formed therein with a guide elongate hole in a longitudinal direction; a fixing bolt for fixing the main body to the support body; a support member installed in the guide hole and having one side in close contact with a shaft and an opposite side in close contact with a spring; a spring installed in the guide elongate hole; and a fixing protrusion configured to protrude from a rear of the main body and selectively fixed to an angle adjustment protrusion formed on the support body to adjust an angle.

The portable emergency situation display device may further include an operation unit provided on a front surface of the cover to control the warning display unit and the road safety image display unit.

Advantageous Effects

According to the portable emergency situation display device for a vehicle of the present invention, the cover closes the upper portion of the case so that the warning display unit is not exposed to the outside when the warning display unit and the road safety image display unit are accommodated in the case, and thus damage to the warning display unit is prevented.

In addition, according to the portable emergency situation display device for a vehicle of the present invention, when the warning display unit rotates, the fixing protrusion is separated from the angle adjustment protrusion while the main body moves to one side by the elasticity of the spring, and when the pressing force is released after rotating the main body, the main body is fixed to the angle adjusting protrusion to adjust the angle while being restored by the spring, so that the correct angle may be maintained while preventing the warning display unit from moving.

In addition, according to the portable emergency situation display device for a vehicle of the present invention, the movement prevention unit is mounted on the lower portion of the case to be retractable and supports the lower portion of the case, so that it is possible to stably use the portable emergency situation display device because it is possible to prevent shaking when using the emergency display device.

BEST MODE

Mode for Invention

Hereinafter, embodiments of the present invention will be described in detail with reference to accompanying drawings.

Figure 1:
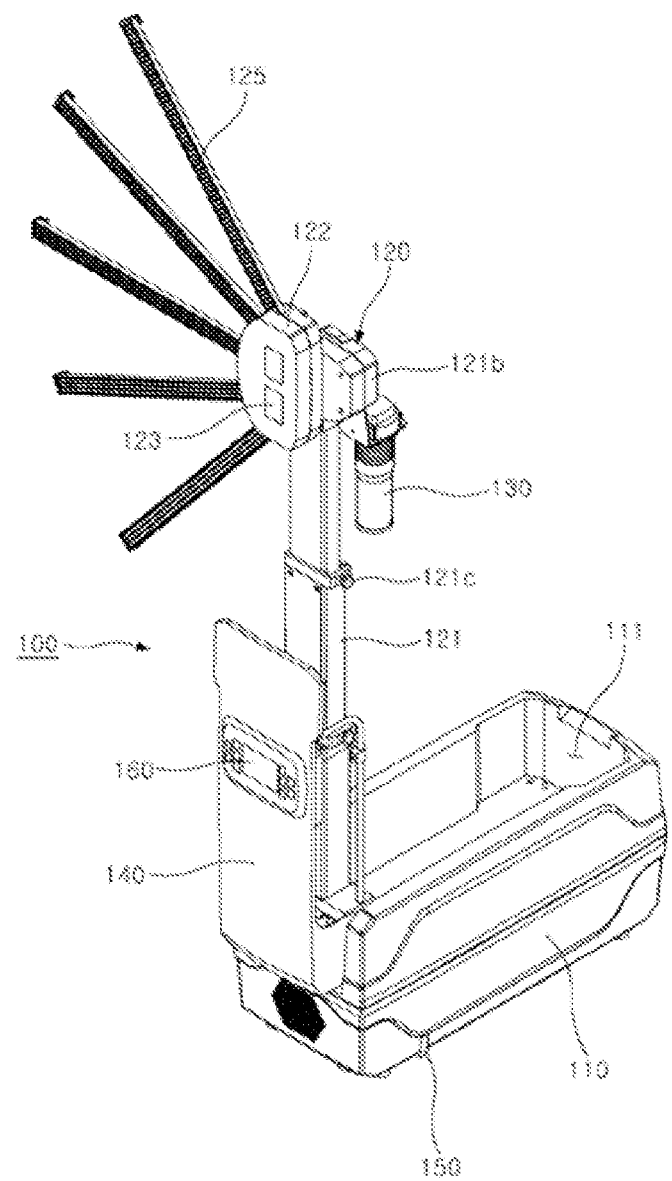
FIG. 1 is a perspective view of an emergency situation display device to which the present invention is applied.
Figure 2:
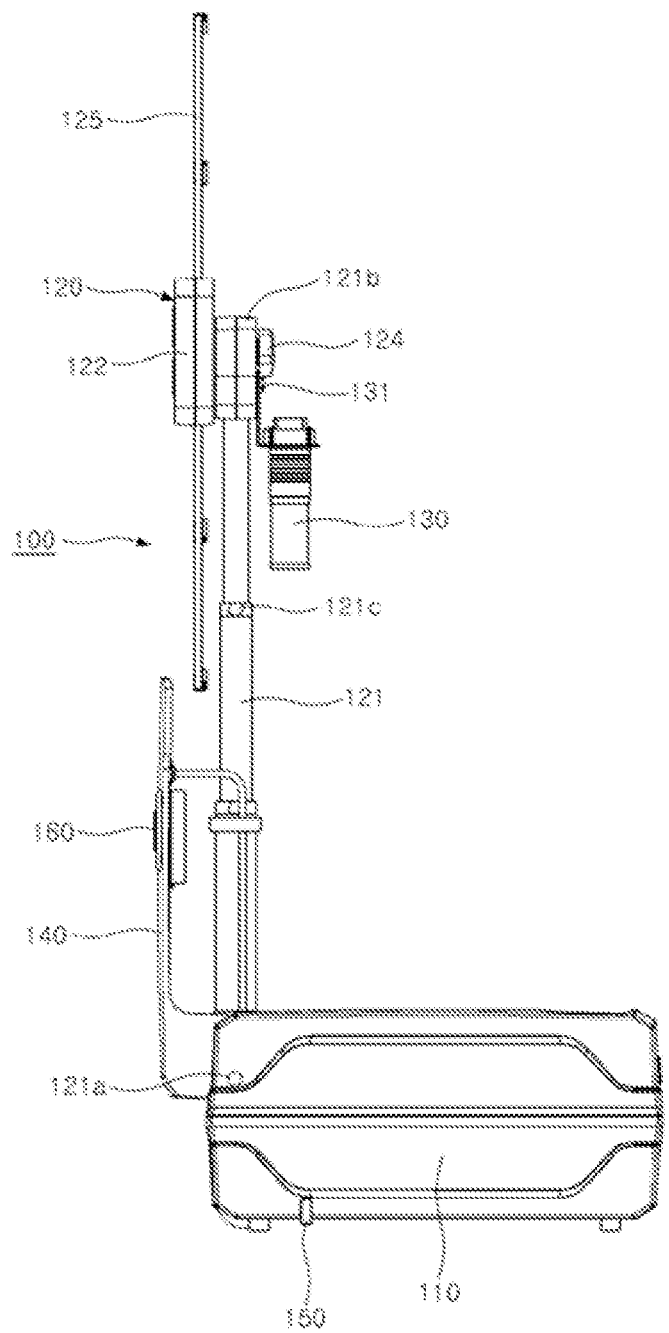
FIG. 2 is a side view of an emergency situation display device to which the present invention is applied.
Figure 3:
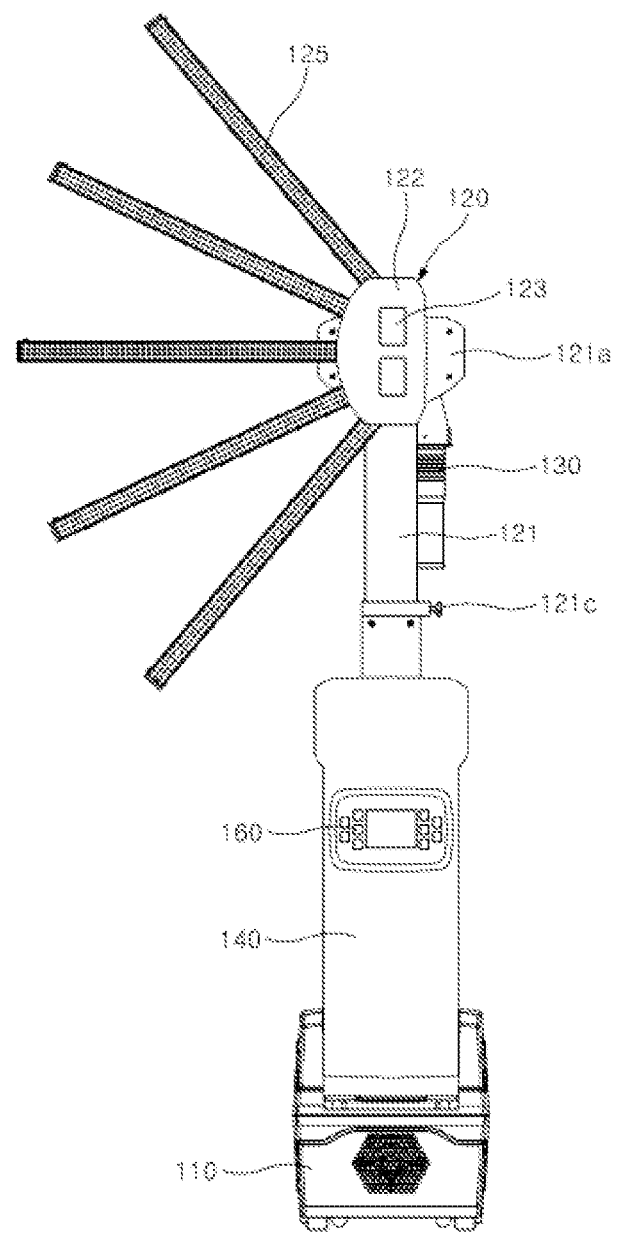
FIG. 3 is a front view of an emergency situation display device to which the present invention is applied.

FIG. 1 is a perspective view of an emergency situation display device to which the present invention is applied. FIG. 2 is a side view of an emergency situation display device to which the present invention is applied. FIG. 3 is a front view of an emergency situation display device to which the present invention is applied.

A portable emergency situation display device 100 for a vehicle according to the present invention substantially includes a case 110, a warning display unit 120, a road safety image display unit 130, and a cover 140.

The case 110 is formed with a receiving space 111 such that the warning display unit 120 and the road safety image display unit 130 can be accommodated into the upper inner side thereof, and a battery B is built in the lower inner side of the case 110 to supply power to the warning display unit 120 and the road safety image display unit 130.

The warning display unit 120, which displays a warning character or warning signal to the vehicle behind to ensure safety, includes a support 121, a support body 122, an operation button 123, a rotation control bolt 124, and a warning display panel 125.

The support 121 is rotatably coupled to one side of the case 110 by a hinge 121*a*, and is formed in at least two multi-stages so that the height can be adjusted. A head 121*b* which is coupled to the support body 122 is formed on the uppermost support 121.

A height adjustment bolt 121*c* is provided on one side of the support 121 to be fixed by adjusting the height of the support 121 drawn out upward.

The support body 122 is rotatably coupled to the head 121*b* of the support 121, and an angle adjustment protrusion 122*a* capable of setting the angle of the warning display plate 125 is formed inside the support body 122. In addition, an operation button 123 is formed on the front surface of the support body 122 to control the warning display panel 125.

The warning display panel 125 is formed in plurality and the plurality of warning display panels 125 is arranged in a line on the support body 122 or spread out at a predetermined angle to display warning characters or warning signals.

The warning display panel 125 is rotated while the main body 125*a* having a guide elongate hole 125*a*' formed thereon is fixed with a fixing bolt 125*b* to the support body 122, and a support member 125*c* is installed in the guide elongate hole 125*a*'. A spring 125*d* is mounted between the guide elongate hole 125*a*' and the support member 125*c*, so that the main body 125*a* is movable by the elasticity of the spring 125*d*.

In addition, a fixing protrusion 125*e* protrudes in the rear direction of the main body 125*a* to adjust the angle of the main body 125*a*. The fixing protrusion 125*a* may be separated from the angle adjustment protrusion 122*a* by moving the main body 125*a* to one side around the fixing bolt 125*b*, thereby fixing the main body 125*a* by rotating the main body 125*a* in a line or at a predetermined angle.

The road safety image display unit 130 may selectively display characters such as speed bumps, speed control, stop, slow speed, under construction, etc. as LED images on the road surface so that the rear driver may be aware of a dangerous situation in advance. The irradiation direction of the LED light source may be adjusted by fastening the rotation coupling member 131 to the rear of the head 121b to fix the road safety image display unit 130.

The cover 140 is formed in front of the warning display unit 120 and rotates integrally with the warning display unit 120. When the warning display unit 120 is accommodated in the receiving space 111 of the case 110, the cover 140 covers the upper portion of the warning display unit 120 so that it is not exposed to an outside.

In addition, a movement prevention unit 150 may be further provided at the lower portion of the case 110 to be retractable from opposite sides of the case 110, and the movement prevention unit 150 stably supports the lower portion of the case 110 to prevent the movement.

The movement prevention unit 150 includes a guide hole 151, a movement prevention member 152, and an elastic member 153.

The guide hole 151 is formed inside the case 110 in the longitudinal direction, and a plurality of adjustment grooves 151a is formed.

The movement prevention member 152 is guided along the guide hole 151 and appears out of the case 110. A guide hole 152a and an adjustment protrusion 152b are formed on one side end of the movement prevention member 152 and is coupled to the guide hole 151.

opposite ends of the elastic member 153 are fixed to the fixing member and the adjustment protrusion 152b formed inside the case 110, thereby providing elasticity to the movement prevention member 152.

In addition, an operation unit 160 may be further provided on the front surface of the cover 140 to control the operations of the warning display unit 120 and the road safety image display unit 130.

The operation unit 160 may be provided with a plurality of buttons, and may select a mode of the warning display unit 120 or a mode of the road safety image display unit 130, so that it is possible to adjust the brightness of the LED light source as well as the volume.

Figure 4:
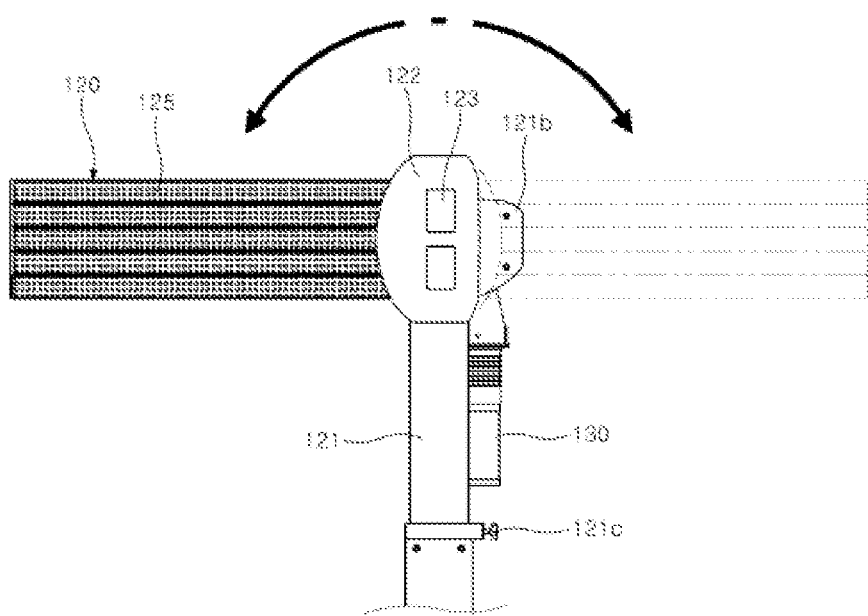
FIGS. 4 to 6 are diagrams illustrating a state of using a warning display unit according to the present invention.
Figure 5:
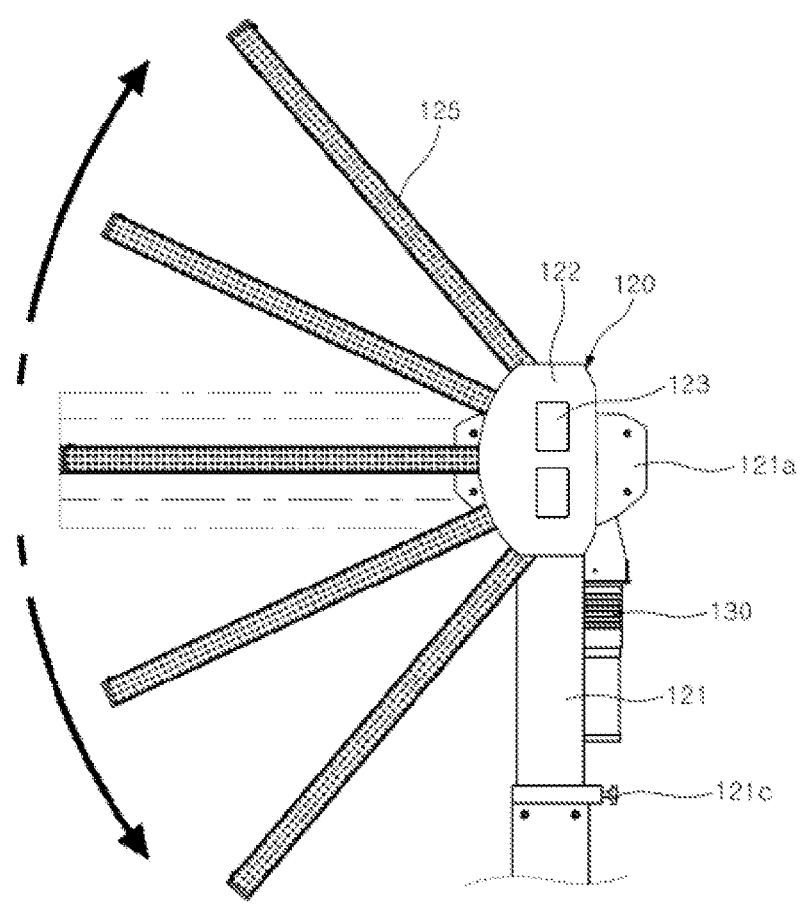
Figure 6:
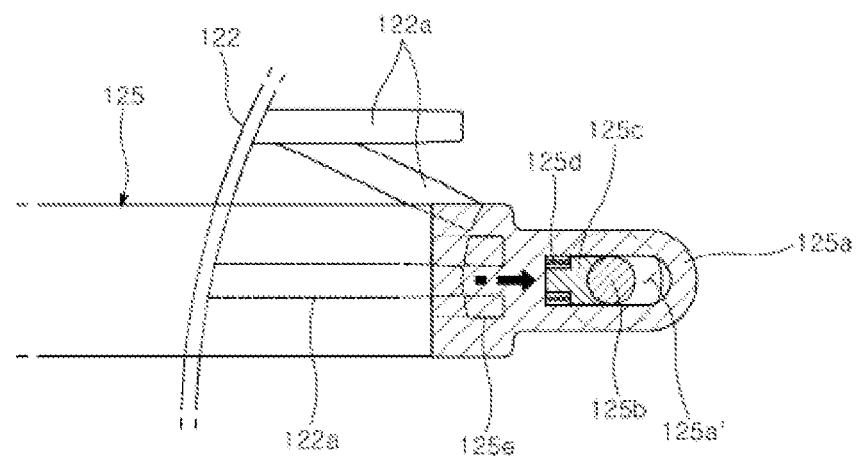

In addition, as shown in FIGS. 4 to 6, the support 121 rotates through the hinge 121a formed on opposite sides and the portable emergency situation display device 100 is accommodated in the case 110 when the portable emergency situation display device 100 is not in use. When in use, the portable emergency situation display device 100 rotates about the hinge 121a to be drawn out from the case 110.

At least one support 121 may be coupled in multiple stages, and each support 121 may adjust the height of the support 121 by loosening the height adjustment bolt 121c provided on the side thereof.

The support body 122 may be rotatably coupled to the head 121b of the support 121 by 360°, and the support body 122 may be rotated by loosening the rotation control bolt 124 at the rear of the head 121b.

An angle adjustment protrusion 122a is formed inside the support body 122 to align the warning display plates 125 in a line or to rotate at a predetermined angle.

The operation button 123 is formed in front of the support body 122 to operate the warning display panel 125 for control.

The support body 122 is equipped with a plurality of warning display panels 125 to use text (no parking, construction, drunk control, etc.), symbols (<<<<, >>>>, etc.), or a blinking operation to display the situation of a field, thereby raising the awareness of drivers to prevent traffic accidents, especially secondary accidents in advance.

The warning display panel 125 may be rotated at a predetermined angle to improve visibility.

First, when the main body 125a of the warning display panel 125 is pulled to one side, the spring 125d installed in the guide elongate hole 125a' and supported by the support member 125c is compressed while the fixing protrusion 125e is separated from the angle adjustment protrusion 122a in the horizontal state.

In this state, when the compression force is released after rotating the main body 125a at a certain angle, the main body 125a is restored by the restoring force of the spring 125d, and at the same time, the angle of the warning display panel 125 is adjusted while the fixing protrusion 125e is coupled to the angle adjustment protrusion 122a formed at a certain angle.

Therefore, even if the wind blows a lot or an external shock is applied due to bad weather, the warning display panel 125 does not move or rotate, so that it is possible to provide accurate emergency situation information to the driver.

Figure 7:
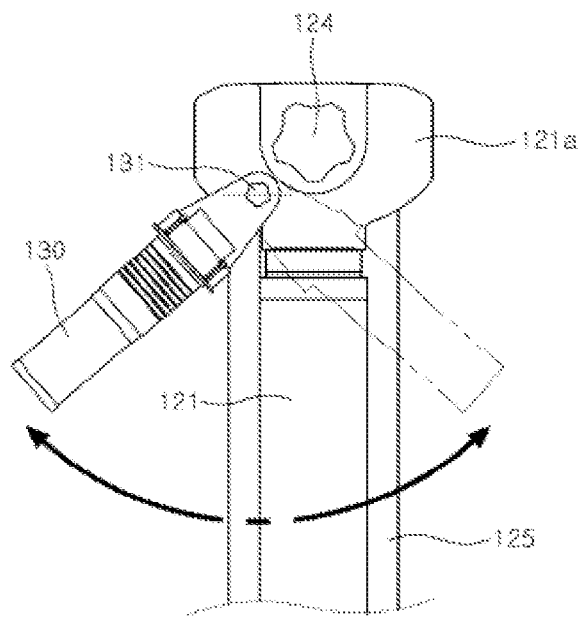
FIG. 7 is a diagram illustrating a state of using a road safety image display unit according to the present invention.

In addition, as shown in FIG. 7, the road safety image display unit 130 is coupled to the rear of the head 121b of the support 121, so that the angle may be arbitrarily adjusted by the rotation coupling member 131. Thus, it is possible for the user to display the speed bump image on the road surface at an appropriate location.

Figure 8:
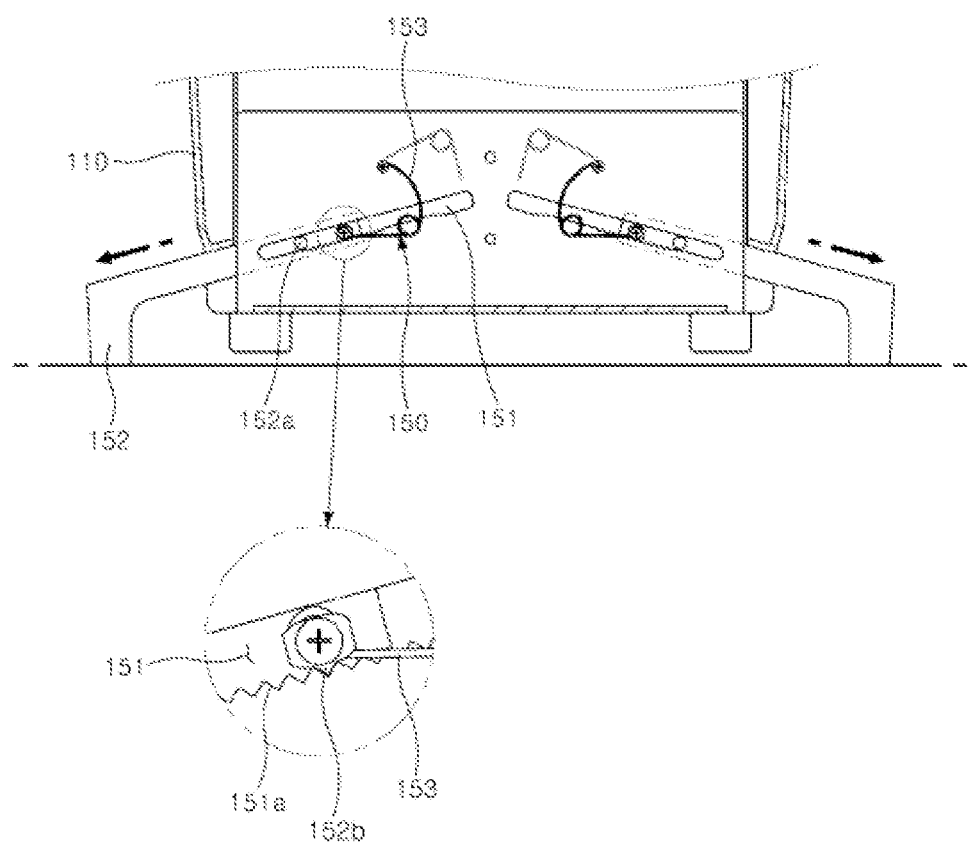
FIG. 8 is a diagram illustrating a state of using a movement prevention unit according to the present invention.

In addition, as shown in FIG. 8, the movement prevention unit 150, which is mounted to be retractable from the case 110, is provided on the lower portion of the case 110 to prevent movement when the portable emergency situation display device 100 is used.

In order to withdraw the movement prevention unit 150 from the case 110, the end of the movement prevention member 152 is withdrawn out of the case 110.

In this case, a guide 152a formed in the movement prevention member 152 is guided along the guide hole 151, and the adjustment protrusion 152b formed in the movement prevention member 152 is withdrawn while being latched to the adjustment groove 151a formed in the guide hole 151.

When the adjustment protrusion 152b is latched into the adjustment groove 151a, the elastic member 153 gives elasticity to the adjustment protrusion 152b to be elastically latched to the adjustment protrusion 151a.

When the movement prevention member 152 is drawn out to opposite sides of the case 110, one side of the case 110 is in close contact with the road surface, and the movement prevention member 152 stably supports the case 110 while the case 110 in the direction in which the flow preventing part 150 is provided is floating from the road surface.

Figure 9:
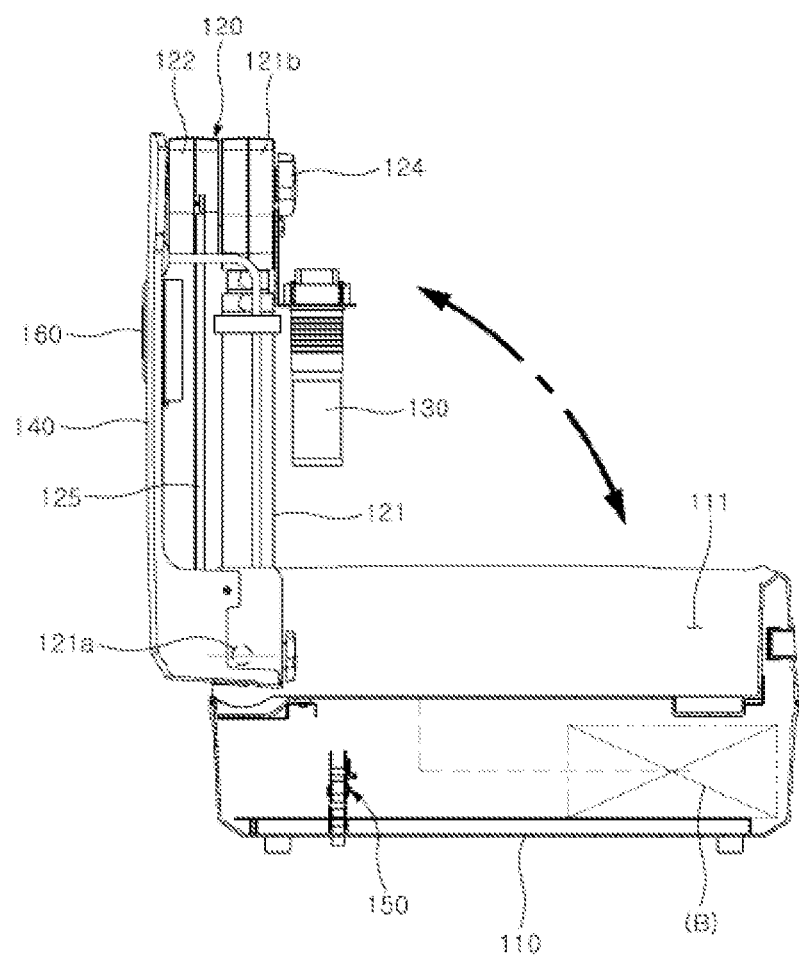
FIG. 9 is a diagram illustrating a state in which a support of a warning display unit is folded and stored in a receiving space of a case according to the present invention.
Figure 10:
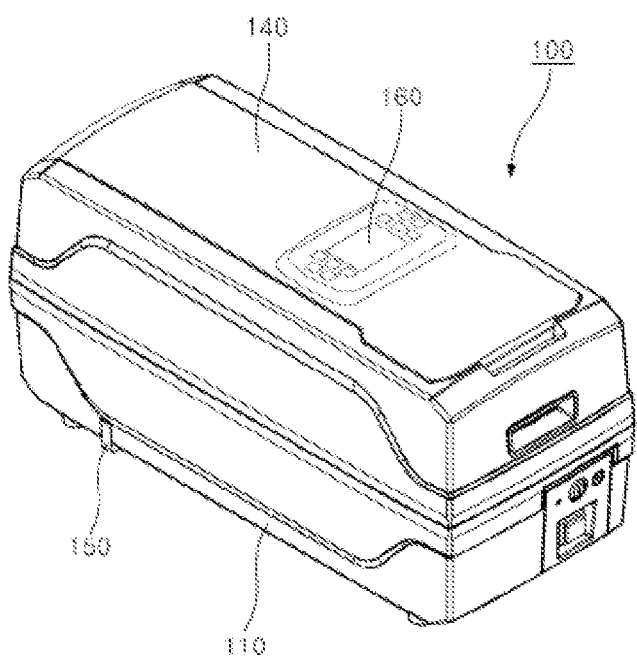
FIG. 10 is a perspective view illustrating a state in which a warning display unit is stored in a case according to the present invention.

As shown in FIGS. 9 to 10, when the use of the portable emergency situation display device 100 according to the present invention is completed, after the warning display panels 125 are arranged in a line in parallel, the support body 122 is rotated through the rotation control bolt 124 to allow the warning display panels 125 are directed downward.

Thereafter, the height adjustment bolt 121c is released to fold the support 121 drawn out in multiple stages so that the warning display unit 120 is placed inside the cover 140.

In this state, when the warning display unit 120 is rotated into the receiving space 111 of the case 110 in this state, the warning display unit 120 is accommodated inside the case 110 while rotating around the hinge 121a.

As described above, when the warning display unit 120 and the road safety image display unit 130 coupled to the rear of the warning display unit 120 are accommodated in the receiving space 111, the cover 140 is positioned on the upper portion of the case 110 to prevent the warning display unit 120 from being exposed to an outside, so that it is possible to prevent the device from being damaged while preventing foreign substances from being introduced into the warning display unit 120.

Therefore, because the portable emergency situation display device 100, which has been contained as described above, is kept in the trunk of a vehicle, the portable emergency situation display device 100 may be easily kept and be safely used while being always maintained in the best state.

While the present invention has been described above using particular examples with reference to the accompanying drawings, it should be understood that the terms used in the specification and the appended claims should not be construed as limited to general and dictionary meanings, but interpreted based on the meanings and concepts corresponding to technical aspects of the present invention.

Therefore, since the embodiments described in the present specification and the configurations shown in the drawings are just embodiments of the present invention only, and do not represent all the technical ideas of the present invention, it should be understood that various equivalents and modifications may be made without departing from the scope of the claims of the present invention.

The invention claimed is:

1. A portable emergency situation display device for a vehicle, the portable emergency situation display device comprising:
   a case provided therein with a receiving space to receive a road safety image display unit and a warning display unit and to supply power of a battery to the road safety image display unit and the warning display unit;
   the warning display unit mounted to be accommodated in the case and including a plurality of warning display panels controlled by a control unit and mounted in a foldable manner to display warning characters or warning signals;
   the road safety image display unit mounted on the warning display unit to visually display a road safety image on a road surface of a road by using an LED light source;
   a cover for closing an upper part of the case while preventing the warning display unit from being exposed to an outside when the warning display unit and the road safety image display unit are accommodated in the case; and
   a movement prevention unit retractably mounted on a lower part of the case to prevent the case from moving,
   wherein the movement prevention unit includes:
   a guide hole formed inside the case and having a plurality of adjustment grooves;
   a movement prevention member having a guide that is guided along the guide hole and an adjustment protrusion, in which movement prevention member protrudes outward of the case as the adjustment protrusion is latched to the adjustment groove; and
   an elastic member having opposite ends fixed to a fixing member and the adjustment protrusion formed in the case to give elasticity to the movement prevention member.

2. The portable emergency situation display device of claim 1, wherein the warning display unit includes:
   a support mounted on one side of the case and installed in multiple stages to enable height adjustment;
   a support body rotatably coupled to a head of the support to support the warning display panel;
   an operation button for controlling the warning display panel in front of the support body;
   a rotation control bolt coupled to the head of the support to control a rotation of the support body; and
   the warning display panels arranged in a row on the support body or spread out at a predetermined angle.

3. The portable emergency situation display device of claim 2, wherein the warning display panel includes:
   a main body rotatably mounted on the support body and formed therein with a guide elongate hole in a longitudinal direction;
   a fixing bolt for fixing the main body to the support body;
   a support member installed in the guide hole and having one side in close contact with a shaft and an opposite side in close contact with a spring;
   a spring installed in the guide elongate hole; and
   a fixing protrusion configured to protrude from a rear of the main body and selectively fixed to an angle adjustment protrusion formed on the support body to adjust an angle.

4. The portable emergency situation display device of claim 1, further comprising:
   an operation unit provided on a front surface of the cover to control the warning display unit and the road safety image display unit.

* * * * *